United States Patent [19]

Nash

[11] Patent Number: 5,088,526

[45] Date of Patent: Feb. 18, 1992

[54] METHOD FOR DISPOSAL OF AEROSOL SPRAY CONTAINERS

[76] Inventor: John P. Nash, 13254 LaQuinta St., La Mirada, Calif. 90638

[21] Appl. No.: 447,952

[22] Filed: Dec. 7, 1989

[51] Int. Cl.$^5$ .............................................. B65B 31/00
[52] U.S. Cl. ........................................ 141/1; 141/51; 141/65; 141/82; 141/11; 141/7; 141/89; 100/902; 29/801; 29/403.1; 29/426.1; 222/80; 222/87; 81/3.2
[58] Field of Search ...................... 141/1, 7, 11, 51, 65, 141/82, 98, 165, 329, 330, 89-92, 97; 100/104, 902; 29/403.1, 403.3, 426.1, 426.3, 426.4, 426.5, 201; 222/80, 81, 87; 81/3.2, 309

[56] References Cited

U.S. PATENT DOCUMENTS

| | | |
|---|---|---|
| 3,232,070 | 5/1963 | Sparano . |
| 3,417,901 | 7/1967 | Sands . |
| 3,993,221 | 11/1976 | Boynton et al. ................ 222/87 |
| 4,261,178 | 4/1981 | Cain . |
| 4,328,843 | 5/1982 | Fujii . |
| 4,364,236 | 12/1982 | Lower et al. . |
| 4,407,341 | 10/1983 | Feldt et al. ..................... 141/97 |
| 4,459,906 | 7/1984 | Cound et al. ................ 100/902 X |
| 4,476,688 | 10/1984 | Goddard . |
| 4,500,015 | 2/1985 | Penney ....................... 222/83.5 |
| 4,526,097 | 7/1985 | Cound ..................... 100/902 X |
| 4,690,180 | 9/1984 | Gold ........................... 141/51 |
| 4,761,961 | 8/1988 | Marx . |
| 4,944,333 | 7/1990 | Gold et al. ..................... 141/51 |

FOREIGN PATENT DOCUMENTS 1607991 10/1970 Fed. Rep. of Germany ........ 141/65

OTHER PUBLICATIONS

Aerosol Age 33(10), advertisement (Oct. 1988).

Primary Examiner—Ernest G. Cusick
Attorney, Agent, or Firm—Nilsson, Robbins, Dalgarn, Berliner, Carson & Wurst

[57] ABSTRACT

A method for disposal of aerosol dispensers and the contents thereof, which comprises cooling of the aerosol dispenser and its residual contents to a temperature below which the propellant exhibits a substantial vapor pressure (i.e., below the boiling point(s) of the propellant(s)). It is then possible to puncture the container without danger of an uncontrolled release of the contents. The cold liquefied propellant and any additional liquid contents of the spray container may then be drained, without any danger of propellant release to the atmosphere, into a collection container capable of subsequently accommodating the vapor pressure of the propellant at ambient temperature. The container is sealed while its contents are still cold and the liquid is allowed to reach ambient temperature, whereby the propellant regains its vapor pressure and some of the propellant mixture returns to a gaseous form. The propellant may be recovered from the container and introduced into suitable containers for transport and ultimate reuse or disposal. The residual liquid in the collection container is also collected for disposal and/or recovery of various components thereof.

21 Claims, 1 Drawing Sheet

METHOD FOR DISPOSAL OF AEROSOL SPRAY CONTAINERS

BACKGROUND OF THE INVENTION

This invention relates to the field of waste disposal, and in particular to disposal of aerosol spray containers and the contents thereof in an economical and environmentally responsible manner.

Aerosol spray containers, such as spray cans and bottles, have long been employed primarily for delivery of liquid materials in the form of a mist or foam. Typically, the aerosol delivery systems employ one or more propellants, at least one of which has a substantial vapor pressure at room temperature. The propellant or pro-pellant mixture which powers the aerosol exists in the pressurized atmosphere of the charged aerosol, at room temperature, in a liquefied physical state, although the headspace contains some gaseous propellant(s).

Aerosol filling plants generally operate on industry-standardized propellant specifications. Product manufacturers commonly fill their own aerosols; an equally common practice is that a product as formulated by the manufacturer is shipped to an aerosol filling operation as an unpressurized bulk or containerized liquid and filled to the product manufacturer's specifications. The particular propellant composition employed is determined in large part by the physical characteristics of the particular product; in general, a central requirement is the ability to attain a specific fill vapor pressure specified by the product manufacturer.

Although a wide range of materials are dispensed in aerosol containers over a range of vapor pressures, there are only a limited number of propellants in general use. The attainment of the necessary range of vapor pressures is achieved by blending a relatively low number of actual propellant materials, with a range of variations in the proportions of the components and the amount of the propellant mixture in the delivery vehicle.

It should be noted that different products dampen or decrease the internal vapor pressure of the product loaded aerosol to different degrees. Thus, two different products, both of which require a charged pressure of e.g. 70 psi and both of which require charging with identical propellants, may require charging of the identical propellants in different proportions.

The propellants in general use at this time include low molecular weight hydrocarbons, such as dimethyl ether (oxygenated), propane, butane and isobutane; the chlorofluorocarbons, such as the various materials commercially available under the designation Dymel or Freon; and inert propellants, such as carbon dioxide, nitrogen and nitrous oxide. Mixtures of propellants within a group, as well as from different groups, are most commonly employed to achieve the desired vapor pressure.

The hydrocarbon group of propellants is one of the two most commonly employed groups and comprises methane, ethane, propane, n-butane, isobutane and dimethyl ether. Mixtures of these hydrocarbons are generally employed to attain different pressures. The actual mixtures employed are usually industry standardized and coded by reference to the maximum pressure attainable therewith; pure propane may be used to achieve a pressure of about 108 psi.

The chlorofluorocarbon group is currently the other most commonly employed group of propellants. It comprises the various chlorofluorocarbons, commercially marketed under a proprietary name such as Freon or Dymel, followed by a numerical designation identifying the particular chlorofluorocarbon compound. The industry also commonly substitutes the chlorofluorocarbon proprietary name with a "P" followed by the identical numerical designation to identify a particular chlorofluorocarbon compound. Due to damage to the ozone layer, the use of these chlorofluorocarbons will be phased out over the next ten years. Mixtures of the chlorofluorocarbons are employed for non-flammable uses; in addition, they may be mixed with hydrocarbons and/or other propellants to attain desired specifications.

Dimethyl ether is achieving more widespread use as the chlorofluorocarbons are being phased out. Dimethyl ether is very volatile and potentially explosive; therefore, it is usually cooled by use with aqueous products or by blending with the nonflammable chlorofluorocarbons.

Finally, the group of inert propellants comprises carbon dioxide, nitrogen and argon; of these, only the first two are generally employed to any significant extent. Carbon dioxide is normally used with solvent based products. Nitrogen is often used to propel products which contain ingredients requiring a relatively high vapor pressure which cannot be attained with the other propellants in use.

Of the aerosol products currently available, less than about 20% employ inert propellants. The vast majority of aerosols are propelled using hydrocarbons, chlorofluorocarbons or mixtures thereof. Under current usage, the hydrocarbon group probably enjoys a slight edge over the chlorofluorocarbons; however, as the use of the latter class is discontinued, it is anticipated that the use of dimethyl ether will increase.

Recent changes in federal regulations have made it not longer possible in most instances to dispose of unpunctured aerosol containers in simple landfills. While unpunctured aerosols may be fed into licensed incinerators at a controlled rate, incinerator time is expensive and regulatory problems may be encountered due to the quality of the resultant flue gas (in particular, with respect to CO emissions). Moreover, while the chlorine content of the flue gas may be accommodated by scrubbing, this is not the case with respect to fluorine, and there is the added disadvantage that fluorine may react with the brick lining of the incinerator. Local air quality regulations often prohibit venting of the residual content of aerosol containers to the atmosphere, and uncontrolled release of chlorofluorocarbons to the atmosphere would in any event be undesirable in view of potential long-term consequences to the environment. In short, there is clearly a need for alternative methods for the safe and economical disposal of aerosol containers and the residual contents thereof.

It is an object of the present invention to provide a method whereby disposal of aerosol spray containers is facilitated. In particular, it is an object of the invention to eliminate the risk of explosion associated with the puncturing of aerosol spray containers, while preventing the escape of deleterious propellant materials into the atmosphere. In addition, it is desired that recovery and disposal of the residual contents of an aerosol spray container in addition to the propellant be possible in a simple and efficient manner.

SUMMARY OF THE INVENTION

These and other objects of the invention are achieved in accordance with the present invention by a method which comprises as a first step cooling of the aerosol spray container to a temperature below which the propellant condenses from gaseous to liquid form, i.e., below the boiling point(s) of the propellant(s). Once the propellant or propellant mixture is in liquid form, it is then possible to puncture the container without danger of an uncontrolled release of the contents. The danger of explosion is also reduced to an insignificant level for several reasons. First, the extremely low temperatures to which the volatile propellants and any volatile organic product ingredients are lowered reduces vapor pressures to the point that evaporation is usually prevented. By preventing evaporation of the volatile compounds, the formation of an explosive volatile/air mixture is avoided. Second, although many standardized propellant mixtures have their own characteristic flash points, the low temperatures employed are usually below the flash point of the propellant mixture being drained.

The cold liquefied propellant and any additional liquid contents of the spray container may then be drained, without any danger of propellant release to the atmosphere, into a collection container which is capable of subsequently accommodating the propellant in gaseous form. At this point, the container is sealed while its contents are still cold and the liquid is allowed to reach ambient temperature, whereby the propellant regains its vapor pressure and some of the propellant mixture returns to a gaseous form, filling the headspace of the sealed container. The now liquid and gaseous propellant may be recovered from the container, for example by explosion proof pump means, and introduced into suitable containers for transport and ultimate reuse or disposal. The residual liquid in the collection container is also collected for disposal and/or recovery of various components thereof.

DETAILED DESCRIPTION OF THE INVENTION

Figure 1:
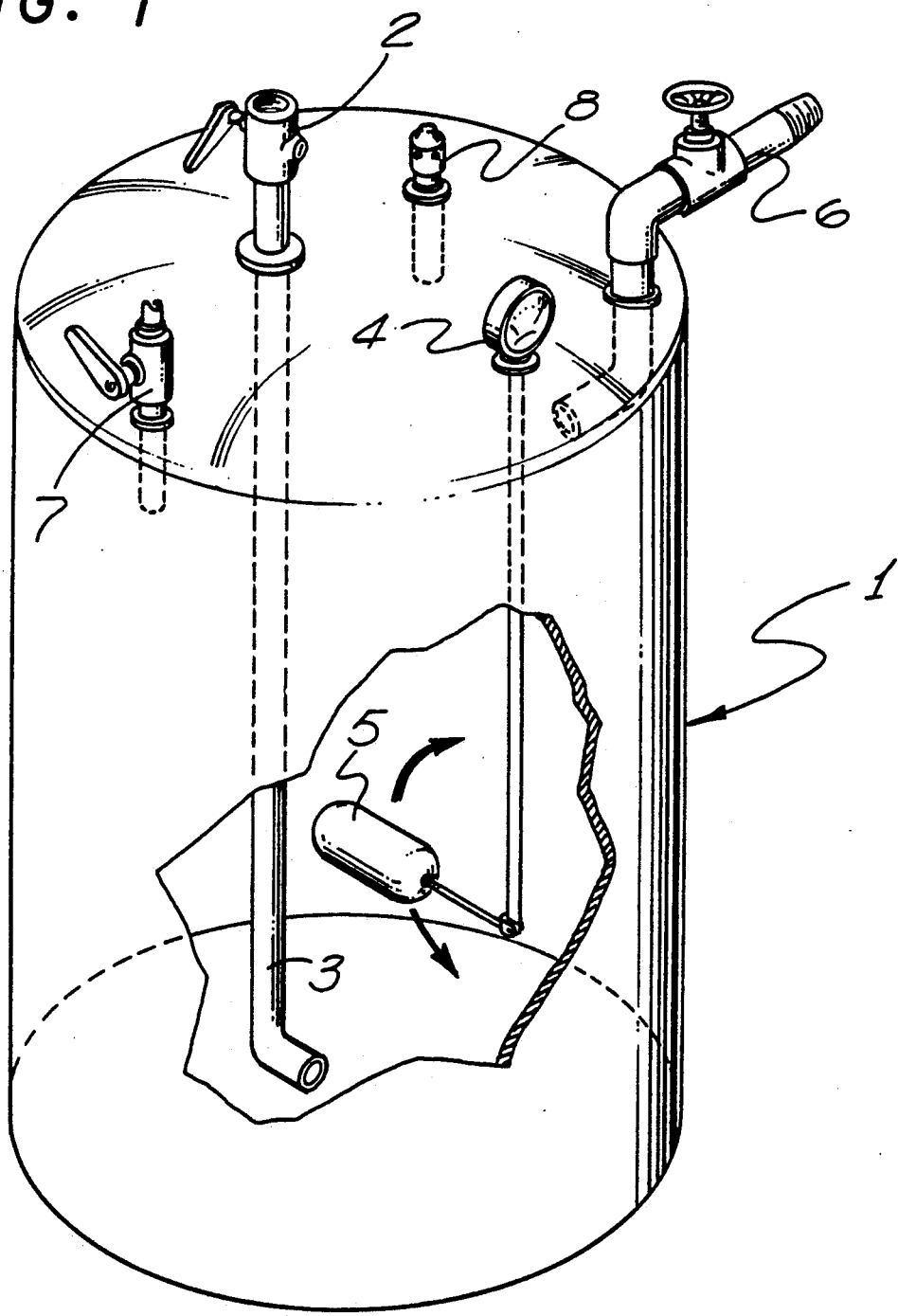
FIG. 1 illustrates a preferred embodiment of a collection cylinder for use in accordance with the present invention.
Figure 2:
FIG. 2 is a schematic representation of the operational steps of the disposal.

Generally, the most common propellants in current use, as indicated in Table I, are liquids below a temperature of about $-80$ F. A suitable method for cooling some aerosol containers and their contents to the propellant liquification temperature is by refrigeration in an air atmosphere. Thus, it is contemplated that for many typical aerosol containers (for example, spray paints propelled entirely by propane), ordinary refrigeration means would be employed to chill the cans to the temperature necessary to liquefy the propellant prior to puncturing.

For aerosols containing a propellant or mixture of propellants which would boil at a temperature below the range over which ordinary refrigeration would be effective, a cryogenic bath may be employed to liquefy the contents of the container prior to puncturing. For many applications, a cooling bath of alcohols and/or glycols which may be admixed with water, chilled with dry ice to an appropriate temperature, will generally be sufficient. As an alternative, liquid nitrogen ($<195.8°$ C.) or liquid helium ($<268.9°$ C.) baths could be employed to effect the desired cooling, when particularly low temperatures are required. The specific method of cooling for a particular batch would be determined by the particular propellant employed in that batch; generally, of course, the easiest and least expensive mode suitable for the propellants in issue would be employed.

Successive cooling modes could also be employed in some applications. For example, a batch might initially be cooled by refrigeration, the least expensive means. If lower temperatures are required, the batch could then be transferred to a dry ice cooled cryogenic bath. If a temperature of $-100°$ C. is for example desired, it could least expensively be attained by initial refrigeration, followed by dry ice cooling in a cryogenic bath to $-79°$ C. and then using the more expensive liquid nitrogen to reach $-100°$ C. It should be noted that in the vast majority of applications, a temperature no lower than $-90°$ C. will be desired. Use of a straight liquid nitrogen cryogenic bath ($-195.8°$ C.) results in the problem that the freezing points of the aerosol products and propellants are commonly reached, thereby preventing draining of the punctured aerosol.

To determine rapidly whether propellant liquification has been successfully achieved in any given instance, the dispensing means of the cooled aerosol spray container, such as for example the nozzle, may be actuated. If no pressure is released by the container upon such actuation, the propellant is in liquid form.

Once the propellant has been substantially completely liquefied, the aerosol spray container is drained of its contents. In most instances, the container is simply punctured to permit drainage of its contents and then disposed of in a manner conventional for materials of similar composition. Because the propellant has been liquefied by cooling, there is no longer any significant danger of explosion upon puncturing.

Cooling of the drained contents of the aerosol containers is continued until a particular batch has been completed or until a sufficient quantity of liquid material has been collected to transfer into the appropriate gas cylinder(s). At this stage, the collected liquid is transferred into gas cylinders cooled to approximately the same temperature as the collected liquid. When filled, the cylinders are then closed and allowed to warm.

As illustrated in FIG. 1, the gas cylinder 1 for collection of liquefied propellant(s) and residual liquids is in general similar in construction to a standard propane gas cylinder. A filling and evacuation tube 2 is provided, running from the top of the cylinder into the cylinder. This tube 2 is then connected in the illustrated embodiment to an internal pipe 3, which runs to a point near the bottom of the cylinder. Internal pipe 3 is not a necessary component of cylinder 1. Tube 2 may suitably comprise at the portion thereof external to the cylinder an upright gas rated ball valve, which substantially prevents splashing as the cylinder is filled; this minimizes crusting on internal hardware and fouling of the valve due to crusting. The cooled mixture of liquefied propellants and residual contents of the aerosol cans is introduced (for example, by means of a funnel) into the cylinder through the open ball valve of tube 2. The liquid mixture then travels through the internal pipe 3 to the bottom of the cylinder. A cylinder liquid level indicator 4 (provided in the illustrated embodiment with a float 5) ensures that the cylinder is filled to the appropriate level.

After the contents of the cylinder have been allowed to warm, the propellant gases are pumped out of the cylinder into a second cylinder (not shown) for gases only through a closed system via gas fill and evacuation fitting 6. Fitting 6 enters the cylinder 1 at the uppermost portion thereof and terminates at the top of the cylinder.

Cylinder 1 is further provided in the depicted embodiment with a vent 7. This vent 7 is intended primarily to allow air to enter the cylinder when the de-gassed liquid contents (i.e., the residual liquids collected from the aerosol cans being treated) are removed, and to allow air to leave the cylinder when the cooled condensed propellant/residual liquid mixture is introduced therein. Vent 7 may be provided with a ball valve or other suitable valve means.

High pressure relief valve 8 suitably is designed to vent the cylinder gas contents in the event the internal cylinder vapor pressure reaches a sufficiently high level that there is a significant danger the cylinder might burst. Notwithstanding the possibility that certain pumps which may be employed with the system can attain such high pressures, in the type of closed system described in preferred embodiments herein it is likely that only aerosol propellants which do not permit attainment of such dangerously elevated pressures would for the most part be collected in the cylinder and pumped therefrom. In particular, the higher pressure propellants such as nitrogen and carbon dioxide are lost during the earlier collection stage, as they are not liquefied at the anticipated general operating temperatures during the chilling procedure.

Generally, the propellant gas is removed from the collection cylinder by suitable pump means (i.e., a pump or series of pumps) and introduced into appropriate storage means, such as conventional gas storage cylinders. Suitable pumps include the Teledyne Sprague Engineering gas booster units of the S86JN series. These pumps are compressed air powered and designed to be substantially explosion proof. The pumps employ a piston differential areas principal, whereby a large area air piston (driven at relatively low pressure) in turn drives a small area compression piston, converting input gas to higher pressure, lower volume output. For exemplary Model S86JN5, the specifications are as follows: ratio - 5:1; drive air requirements - 25 to 200 psi: precharge inlet air range - ca. 25-50 to 1100 psi; and outlet pressure range - 125 to 1100 psi. Of course, a wide variety of other types of pump may also be employed to separate propellants from the mixture recovered after the aerosol cans are chilled and punctured.

The precharge (i.e., required minimum) inlet pressure for the exemplary pumps discussed herein establishes a pressure at which the pumps cease to operate due to the fact that there is insufficient inlet pressure to return the major piston to a drive position, activate the drive command mechanism and thereby complete the next cycle. Thus, in practice of the invention in accordance with the described embodiment using the exemplary type of pump, a problem arises when pumping mixed propellants from a typical cylinder containing a mixture of residual liquids and collected propellants, as a significant quantity of propellants may remain in the cylinder from which the propellants are being recovered when internal pressure drops below the specified inlet pressure for the pump means (and, therefore, the pump ceases to operate). One solution is to provide the pump with an air diversion tube (for example, prepared from a piece of aluminum tubing of suitable diameter) which causes some of the pump drive air to be diverted from driving the pump for use in returning the primary piston to a drive position. In this manner, the ordinary inlet pressure requirement of the pump may be reduced from the inlet pressure normally specified down to zero. Thus modified, however, the efficiency of the pump in terms of volume movement is greatly reduced, particularly when operating at pressures above the specified inlet value.

To optimize efficiency of operation at higher pressures, the air diversion tube may be modified by inclusion of suitable valve means, such as a conventional ball valve. The valve means is closed when the internal pressure of the cylinder from which a propellant mixture is being removed is above the specified inlet pressure of the pump. After the bulk of the propellant mixture has been removed from the cylinder, the pressure eventually drops below the requisite inlet pressure and operation of the pump ceases. At this point, the air diversion line may be engaged by opening the valve means, and removal of the propellant mixture from the cylinder continues. When the internal pressure of the cylinder reaches atmospheric pressure, substantially all propellants have been removed therefrom and the transfer operation is completed.

The gas or mixture of gases is reliquefied by pump compression in the receiving gas cylinder. Depending upon the composition of the reconstituted gaseous propellant in the collection container, it may be recovered directly or subjected to additional treatment steps so as, for example, to separate individual components thereof. Single gases, such as propane, or suitable gas mixtures could be used for routine applications. After transfer to suitable containers for transport, gas mixtures having limited recovery value could alternatively be shipped to disposal sites, where they could be subjected to suitable disposal treatment, such as incineration.

Typically, the residual liquid contents of the aerosol spray container (e.g., paint, adhesive, lubricants, etc.) will either have limited recovery value, or will be difficult to separate into useful components once drained from the collection container. Accordingly, the liquid material may be emptied into a drum or tank suitable for shipment to a suitable site for destructive incineration, use in an approved fuels program, etc. Of course, where feasible any valuable components of the liquid may also be recovered.

Where the propellant comprises $CO_2$, there is of course no significant problem with respect to release thereof to the atmosphere. Indeed, under usual regulatory conditions, there is no need to capture carbon dioxide, nitrogen, nitrous oxide and argon propellants, as these gases are found naturally in the atmosphere and offer no threat of harm to the environment. In order to minimize release of volatile organic components therewith, however, the inert propellants are suitably first passed through some type of filter means (e.g., activated carbon or charcoal) so as to remove any entrained organic materials. Reduction of the temperature to a point suitable for liquefying the majority of typical propellants is usually sufficient to control the release of the majority of such volatile materials during carbon dioxide venting as well.

Only ethane, methane and Freon 13 have boiling points lower than the sublimation temperature of carbon dioxide. Accordingly, unless one or more of these three propellants is present in a batch of spent aerosols, a carbon dioxide cooled cryogenic bath or simple refrigeration means would be sufficient to attain the necessary temperatures for propellant liquification. The same is true with respect to propellant mixtures containing inert propellant gases, as these need not be captured; however, it is generally desirable to remove other contaminants entrained in these gases, for example by scrubbing as discussed hereinafter.

If ethane, methane and/or Freon 13 were present as minor components of a propellant mixture and capture was necessary, it would still be possible to carry out the inventive method using a single or successive cooling modes previously discussed. Cooling to approximately $-100°$ C. results in the liquification of the ethane and chlorotrifluoromethane, which are then captured in the usual manner. Methane when present would be released upon puncturing, at reduced pressure, into the puncturing chamber. The methane could then be evacuated from the puncturing chamber and destroyed, e.g., by the use of an afterburner.

A number of alternative methods for the capture of unliquefied, low boiling propellants are also available. For example, these propellants could be solubilized into a solvent in accordance with conventional scrubbing techniques or removed using activated carbon filtration. Alternatively, use may be made of a condensing tube cooled to a temperature below the boiling point of the propellant to liquefy the material. After removal of Freon 13, an afterburner could be employed to burn ethane and methane residues.

Although the emptied cans recovered after removal of the liquefied propellants and any remaining liquid contents are not subject to federal restrictions concerning their disposal, it is contemplated pursuant to a further embodiment of the present invention that any residues of the prior contents of the cans may also be recovered and contained prior to metals reclamation or landfill disposal. For example, these residues may be removed by rinsing with an appropriate solvent. Vapors may be condensed or solubilized into an appropriate solvent. Activated carbon or other filtration treatments may also be useful. Finally, residues which have been treated to remove chlorinated and fluorinated substances may be disposed of using an afterburner. In many cases, the composition of the residues and/or the amount thereof will be such as simply not to warrant any treatment of the drained aerosol cans prior to disposal.

In a further embodiment of the inventive method, low level propellants which boil at temperatures below those employed for cooling the aerosol cans before puncturing and/or gases captured while collecting the warming, punctured and drained aerosol cans may be disposed of directly by combustion in an afterburner. Additional fuels may be added to any such gas mixture to achieve more complete combustion. To remove any chlorine- or fluorine-containing gases generated thereby, a scrubbing system or other contaminant removing means is preferably employed.

Pursuant to a further embodiment of the present invention, after separation of aerosol propellants from the mixed residual liquid contents of the aerosol dispensers, the propellant mixture may under some circumstances be most advantageously disposed of by means of controlled combustion, such as in a cement kiln incinerator of the type often suitably employed for disposal of the residual liquid contents of particular classes as well. In this manner, it is possible to eliminate the step of separating the propellant mixture from the residual liquid contents of the aerosol dispensers entirely. Typically, waste materials for combustion are fed into the cement kiln by means of a liquid feed or pipe system. Where incineration of the propellant mixture as well as the residual liquids is contemplated, a suitable pressure rated hose for transfer of cylinder contents to incineration means is attached to the cylinder filling and evacuation tube 2. At temperatures approaching ambient, the cylinder contents are under significant pressure due to the propellant mixture. Upon opening of the tube 2 to the hose (for example, in the case of the illustrated embodiment, by release of the contemplated valve means), the liquid contents of the cylinder is forced through the hose by head space gases to the incineration means. Control of pressure and feed rate to the incinerator means is suitably maintained, for example, by gauged opening of the valve means in the illustrated embodiment or other forms of flow control as are conventional in the art.

A particular advantage of the present invention is that it permits efficient and commercially viable treatment of aerosol dispensers for ultimate disposal even on a relatively small scale. Compared in particular with disposal methods currently available, the present invention in its various embodiments not only solves the particular problems associated with the various propellant gases as waste materials per se, but also may permit recovery of varying amounts of potentially reusable propellants and/or residual liquid contents. Moreover, in those instances where substantial quantities of essentially homogeneous materials are received for treatment (for example, a batch of a defective or outdated aerosol product), the present invention provides a particularly advantageous method for disposal and/or recycling of the materials.

In general, however, execution of the inventive method is contemplated to involve the treatment of mixed aerosol products which have been received at the disposal facility in an unsegregated condition with respect to the types of propellant and compositions of the residual liquids. Accordingly, in a typical large-scale treatment process, it is anticipated that some degree of initial individual handling of the aerosol containers may be necessary in order to segregate any materials which would require special handling. For example, it would be advantageous to identify any aerosol dispensers containing propellants (e.g., ethane or methane) which would necessitate operating parameters other than a simple dry ice cooled cryogenic bath treatment to avoid any danger of explosion upon the puncturing of the dispensers. In addition, to the extent that recovery of particular classes of residual liquids might be economically viable, this initial handling stage would permit isolation of dispensers containing such residual liquids for separate treatment.

Following initial labor handling on the production line, it is presently preferred that the aerosol dispensers be processed to completion by means of a batch method, wherein each individual batch is subjected in sequence to a rapid treatment. In a presently preferred embodiment, the individual batches are processed in racks comprising a plurality of individual cages each holding a single aerosol dispenser. Suitably, the cages are formed of a heavy wire stock or similar material which serves to maintain the aerosol dispensers essentially in a fixed position during subsequent treatment. As presently contemplated, the racks may conveniently comprise one cage in width. The length of the racks is not significant and may be varied over a broad range; for example, racks may reasonably be as short as about six cages to as long as several dozen or more. Thus, a loaded rack comprises a row of aerosol dispensers of any suitable length, wherein each aerosol dispenser is engaged in an individual cage to prevent significant relative movement of the dispensers in all directions.

In order to reduce relative movement of the dispensers after loading thereof into individual cages, it is contemplated that the racks be provided with some type of mechanism for securing each dispenser in place, such as a mechanically-activated row locking device. Thus, a loaded spring device may be employed to retain the aerosol dispensers by ring compression over the aerosol nozzle. Alternatively, in a preferred embodiment the dispensers are kept in place by sidewall compression. In a particularly preferred arrangement, the racks are fitted with suitable guiding hardware so that they may eventually be locked onto puncturing equipment. The row of individual aerosols locked into position on the puncturing equipment is then tilted to one side to permit efficient gravity draining following puncturing. If desired, the racks could be enlarged by successive rows of cages. In this event, successive rows of puncturing equipment are added to accommodate the desired rack size. Racks may suitably be moved from one treatment step to the next by, e.g., moveable overhead equipment, much as a rack of parts is moved from one tank to the next in a metal plating operation.

While it is of course within the scope of the present invention that an automated continuous production line be employed for movement of individual aerosol dispensers through a chilling medium and/or refrigeration unit, it is currently preferred that the aerosol dispensers be treated in a batch process, wherein a plurality of dispensers arranged in the aforementioned racks are chilled simultaneously by, e.g., timed refrigeration, submersion in a cryogenic fluid, or a succession of both. Depending upon the particular arrangement employed for cooling, one or more racks could of course be processed over a given interval of time.

Upon completion of the cooling and liquification of the aerosol propellants, the loaded rack is then advanced to a suitable puncturing chamber. The puncturing chamber is designed to prevent the uncontrolled escape of any contents of the aerosol dispensers not liquefied in the preceding cooling step; in addition, if required by applicable air quality regulations, escape of residual vapors (e.g., low level prior puncture vapors evaporating from the knives) during the loading operation may be prevented by the creation of a negative pressure (for example, using a forced air scrubber, condenser or vapor burner). Rack movement could, if desired, be controlled by command or by automated timer. Advantageously, more than one rack may be accommodated in the puncturing chamber.

Each loaded rack in the puncturing chamber is mechanically locked into place for engagement of puncturing equipment. Suitably, pointed metallic tools of a material which does not generate sparks during the puncturing process are employed. In accordance with one presently preferred embodiment, a plurality of puncturing tools is employed to effect puncturing of an entire row of the rack of retained aerosol dispensers simultaneously. To facilitate the puncturing operation, the plurality of tools may for example be mounted on a cylindrical shaft with bearings at both ends, and the shaft rotated (e.g., hydraulically) a short distance to puncture the aerosol dispensers at or near the bottoms thereof. A configuration in which the aerosols are tilted in one direction facilitates gravity draining of the aerosol contents. In one embodiment, the puncturing knives sweep through an arc. The arc initially sweeps the knives so that they puncture and enter the aerosol at the low end of the tilted aerosol. The knives continue through the arc to puncture the aerosol again and exit at a point above the centerline of the tileted aerosol; thus, a vent is provided to speed draining. Rotation of the knives ceases shortly after the vent puncture, and the arc is reversed to return the knives to their initial positions.

Capacity of the puncturing chamber may be increased as desired by adding additional rows of puncturing equipment to accommodate, e.g., additional racks the width of one aerosol or a single rack the width of several aerosols It is of course contemplated that alternative procedures may be employed, depending upon the size and arrangement of the rack, the type of aerosol dispenser, etc.

The residual aerosol contents and liquefied propellants are then gravity-drained from the punctured dispensers into suitable collection means, such as a trough beneath the rack(s) and the puncturing mechanism. To facilitate collection of the liquids, the trough is advantageously sloped so that the mixture drains towards one end and thereafter into a gas cylinder of the type hereinbefore described, at a suitably reduced temperature to maintain the collected propellants in liquid form. In order to avoid premature evaporation of the propellants, the collection trough is also advantageously maintained in a continuously chilled state; for example, a hollow trough cooled by cryogenic fluids may be employed. Continuous circulation of coolant fluids from the aerosol chilling bath to the trough and/or to a bath chilling the collection cylinder may provide a particularly efficient means for maintaining the desired temperature.

In general, a fairly broad range of structures may be employed as puncturing chamber, up to and including an entire industrial building dedicated to the purpose. To prevent a buildup of vapors in the large-scale arrangements, it will of course be necessary to provide suitable vapor monitoring equipment, ventilation means, vapor recovery system, scrubber, exhaust burner or combination thereof. It should be kept in mind that when the system is functioning perfectly, there would be a slow buildup indoors of volatile vapors from the puncturing knives and the drained aerosol cans as they are allowed to warm. Independent means could be used to control and capture these vapors as described, if necessary. If puncturing were in suitable cases performed outdoors, it is not likely that stringent vapor control measures would be necessary for either fire safety or protection for personnel from exposure. In any event, indoor use of cryogenic baths cooled by dry ice or liquid nitrogen would be limited by the danger of potential build-up of gases which could cause unconsciousness or even asphyxiation.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

TABLE I

| Structural Formula | Propellant | Boiling Point | Flash Point |
|---|---|---|---|
| $CH_3CH_3$ | Ethane | $-88.63°$ C. | $202°$ F. |
| $CH_4$ | Methane | $-161.6°$ C. | $-306°$ F. |
| $CH_3CH_2CH_3$ | Propane | $-42.5°$ C. | $-189.9°$ C. |
| $CH_3CH_3CH_3CH$ | Isobutane | $-11.7°$ C. | |
| $CH_3CH_2CH_2CH_3$ | N-butane | $-0.5°$ C. | $-76°$ F. |
| $CCl_3F$ | *Freon 11 trichloro-fluoromethane | $+23.7°$ C. | N.F. |
| $CCl_2F_2$ | *Freon 12 diochloro-difluoromethane | $-29.8°$ C. | N.F. |
| $CClF_3$ | *Freon 13 chlorotri-fluoromethane | $-81.4°$ C. | N.F. |
| $CHClF_2$ | *Freon 22 chloro-difluoromethane | $-40.75°$ C. | P.N.F. |
| $C_2Cl_3F_3$ | *Freon 113 1,1,2-trichloro-1,2,2 tri-fluroethane | $+47.57°$ C. | P.N.F. |
| $Cl_2CFCF_3$ | *Freon 114 1,1-dichloro-1,2,2,2-tetrafluoroethane | $+3.55°$ C. | P.N.F. |
| $C_2ClF_5$ | *Freon 115 chloropenta-fluoroethane | $-38.7°$ C. | N.F. |
| $CH_cCHF_2$ | *Freon 152 a | $-13.0°$ F. | |
| $CH_3OCH_3$ | *Freon 142 b | $+14.4°$ F. | |
| $CH_3OCH_3$ | Dimethyl Ether | $-24.5°$ C. | $-41°$ F. |
| $CO_2$ | Carbon Dioxide | $-78.5°$ C. | N.F. |
| N | Nitrogen | $-195.8°$ C. | N.F. |
| Ar | Argon | $-185.7°$ C. | N.F. |
| $N_2O$ | Nitrous Oxide | $-88.46°$ C. | N.F. |

*Proprietary Trade Name
N.F.: Non Flammable
P.N.F.: Practically Non Flammable

What is claimed is:

1. A method for disposal of residual contents of an aerosol dispenser containing a dispensable liquid material and at least one aerosol propellant having a substantial vapor pressure at ambient temperature, which method comprises:
   cooling the aerosol dispenser to a reduced temperature below which the at least one aerosol propellant exhibits a substantially reduced vapor pressure, thereby forming a mixed residual liquid comprising the dispensable liquid material and liquefied aerosol propellant with a substantially reduced vapor pressure;
   puncturing the cooled aerosol dispenser; and
   draining the mixed residual liquid from the aerosol dispenser while maintaining the mixed residual liquid at said reduced temperature into a collection container capable of accommodating the vapor pressure of the aerosol propellant at ambient temperature.

2. A method according to claim 1, further comprising:
   sealing the collection container while the mixed residual liquid is maintained at said reduced temperature; and
   allowing the mixed residual liquid to reach ambient temperature thereby forming a processed liquid material and at least one processed aerosol propellant having a substantial vapor pressure.

3. A method according to claim 2, wherein pressure generated by the at least one processed aerosol propellant in the collection container is employed to transfer the processed liquid material together with the at least one processed aerosol propellant from the collection container to an external transfer or disposal site.

4. A method according to claim 2, wherein the at least one processed aerosol propellant is recovered from the collection container separately from said processed liquid material.

5. A method according to claim 4, wherein after the at least one processed aerosol propellant is recovered, the processed liquid material is disposed of by combustion.

6. A method according to claim 4, wherein the at least one processed aerosol propellant that has been recovered is disposed of by combustion.

7. A method according to claim 1, wherein the aerosol dispenser is cooled by refrigeration.

8. A method according to claim 1, wherein the aerosol dispenser is cooled by a cryogenic bath.

9. A method according to claim 8, wherein said cryogenic bath is cooled using dry ice and comprises a liquid selected from the group consisting of alcohols, glycols, mixtures thereof and mixtures of one or more thereof with water.

10. A method according to claim 8, wherein said cryogenic bath comprises liquid nitrogen or liquid helium.

11. A method according to claim 1, wherein dispensing means of the cooled aerosol dispenser is actuated prior to said puncturing to determine whether the vapor pressure of the at least one aerosol propellant is substantially reduced.

12. Apparatus for disposal of residual contents of an aerosol dispenser containing a dispensable liquid material and at least one aerosol propellant having a substantial vapor pressure at ambient temperature, said apparatus comprising:
   means for cooling said aerosol dispenser to a reduced temperature below which the at least one aerosol propellant exhibits a substantially reduced vapor pressure, thereby forming a mixed residual liquid comprising the dispensable liquid material and liquefied aerosol propellant with a substantially reduced vapor pressure;
   means for puncturing said aerosol dispenser so as to permit drainage of said mixed residual liquid from the aerosol container; and
   collection means for receiving said mixed residual liquid, said collection means being capable of accommodating the vapor pressure of the aerosol propellant at ambient temperature.

13. The apparatus of claim 12 wherein said collection means is a gas cylinder having a filling and evacuation means for delivery of mixed residual liquid into said gas cylinder and a gas fill and evacuation fitting for allowing removal of aerosol propellant from said gas cylinder.

14. A method of disposing of a residual liquid material and a propellant having a substantial vapor pressure at ambient temperature contained within an aerosol dispenser, comprising the steps of:
   cooling the aerosol dispenser to a temperature below the boiling point of the propellant, thereby forming a mixed residual liquid material within said aerosol dispenser;

puncturing the aerosol dispenser after said mixed residual liquid material is formed; and draining said mixed residual liquid material from the aerosol dispenser while maintaining the mixed residual liquid material at approximately said temperature below the boiling point of said propellant into a collection container capable of accommodating the vapor pressure of said propellant at ambient temperature.

15. The method according to claim 14 further comprising:

sealing the collection container while the temperature of said mixed residual liquid material is below the boiling point of the propellant; and warming the mixed residual liquid material thereby forming a processed residual liquid material and a processed propellant within the sealed collection container.

16. The method according to claim 15 wherein the processed residual liquid material and the processed propellant are disposed of by combustion.

17. The method according to claim 15 wherein said processed propellant is recovered from the collection container separately from said processed residual liquid material.

18. The method according to claim 17 wherein said recovery of said processed propellant is done by pumping the processed propellant from the headspace of the collection container and into a second collection container.

19. The method according to claim 14 further comprising:

sealing the collection container while the temperature of said mixed residual liquid material is below the boiling point of the propellant; and allowing the mixed residual liquid material to warm thereby forming a processed residual liquid material and a processed propellant within the sealed collection container.

20. A method of disposing of a residual liquid material and a propellant having a substantial vapor pressure at ambient temperature contained within an aerosol dispenser, comprising the steps of:

cooling the aerosol dispenser to a temperature below which said propellant condenses from a gaseous form to a liquid form, thereby forming a mixed residual liquid material within said aerosol dispenser;

puncturing the aerosol dispenser after said mixed residual liquid material has formed; and draining said mixed residual liquid material from the aerosol dispenser while maintaining the mixed residual liquid material at approximately said temperature into a collection container capable of accommodating the vapor pressure of said propellant at ambient temperature.

21. A method of disposing of a residual liquid material and a propellant having a substantial vapor pressure at ambient temperature contained within an aerosol dispenser, comprising the steps of:

cooling the aerosol dispenser to a temperature necessary to liquify said propellant, thereby forming a mixed residual liquid material within said aerosol dispenser;

puncturing the aerosol dispenser after said mixed residual liquid material has formed; and draining said mixed residual liquid material from the aerosol dispenser while maintaining the mixed residual liquid material at approximately said temperature into a collection container capable of accommodating the vapor pressure of said propellant at ambient temperature.

* * * * *

UNITED STATES PATENT AND TRADEMARK OFFICE
CERTIFICATE OF CORRECTION

PATENT NO. : 5,088,526

DATED : February 18, 1992

INVENTOR(S) : John P. Nash

It is certified that error appears in the above-identified patent and that said Letters Patent is hereby corrected as shown below:

Column 2, line 38, "not" should be --no--.

Column 11, line 9, "202°F" should be -- -202°F--.

Signed and Sealed this

First Day of June, 1993

Attest:

MICHAEL K. KIRK

Attesting Officer

Acting Commissioner of Patents and Trademarks